United States Patent
Skillsäter et al.

(10) Patent No.: US 10,821,992 B2
(45) Date of Patent: Nov. 3, 2020

(54) METHOD AND SYSTEM FOR PREDICTING A RISK FOR ROLLOVER OF A WORKING MACHINE

(71) Applicant: VOLVO CONSTRUCTION EQUIPMENT AB, Eskilstuna (SE)

(72) Inventors: Calle Skillsäter, Torshälla (SE); Patrik Wahlström, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 366 days.

(21) Appl. No.: 15/577,844

(22) PCT Filed: Jun. 3, 2015

(86) PCT No.: PCT/SE2015/050648
§ 371 (c)(1),
(2) Date: Nov. 29, 2017

(87) PCT Pub. No.: WO2016/195557
PCT Pub. Date: Dec. 8, 2016

(65) Prior Publication Data
US 2018/0162410 A1    Jun. 14, 2018

(51) Int. Cl.
*B60W 40/112* (2012.01)
*B60W 30/04* (2006.01)
(Continued)

(52) U.S. Cl.
CPC .......... *B60W 40/112* (2013.01); *B60W 30/04* (2013.01); *B60W 50/14* (2013.01);
(Continued)

(58) Field of Classification Search
CPC ....... B60W 40/112; B60W 2040/1315; B60W 50/0097; B60W 2050/143; B60W 50/14;
(Continued)

(56) References Cited

U.S. PATENT DOCUMENTS 6,498,976 B1   12/2002   Ehlbeck et al.
2005/0102083 A1   5/2005   Xu et al.
(Continued)

FOREIGN PATENT DOCUMENTS

CA   2815816 A1   3/2014
EP   1813569 A1   8/2007
(Continued)

OTHER PUBLICATIONS

International Search Report (dated Feb. 10, 2016) for corresponding International App. PCT/SE2015/050648.
(Continued)

*Primary Examiner* — Bao Long T Nguyen
(74) *Attorney, Agent, or Firm* — Sage Patent Group (57) ABSTRACT

A method is provided for predicting a risk for rollover of a working machine for load transportation. The method includes: obtaining ground topographic data of a geographical area located close to the working machine from a ground topographic detection system; extracting a ground gradient from the ground topographic data; obtaining weight information of the load being currently transported by means of an on-board load weighting system or by receiving load information originating from the device that loaded the load being currently transported; determining a current maximal allowed ground gradient for the working machine based on the weight information; and predicting a risk for working machine rollover if the working machine approaches a geographical area including a ground gradient exceeding or being close to the current maximal allowed ground gradient for the working machine.

24 Claims, 5 Drawing Sheets

(51) Int. Cl.
  *B60W 50/14* (2020.01)
  *B60W 40/13* (2012.01)
  *G01C 11/02* (2006.01)
  *B60W 50/00* (2006.01)

(52) U.S. Cl.
  CPC . *B60W 50/0097* (2013.01); *B60W 2040/1315* (2013.01); *B60W 2050/143* (2013.01); *B60W 2300/17* (2013.01); *B60W 2420/42* (2013.01); *B60W 2530/10* (2013.01); *B60W 2552/15* (2020.02); *B60W 2552/20* (2020.02); *B60W 2556/50* (2020.02); *B60Y 2200/145* (2013.01); *B60Y 2200/41* (2013.01); *G01C 11/02* (2013.01)

(58) Field of Classification Search
  CPC ............. B60W 30/04; B60W 2420/42; B60W 2300/17; B60W 2550/143; B60W 2550/142; B60W 2550/402; B60W 2530/10; B60W 40/02; B60W 40/06; B60W 40/072; B60W 40/076; B60W 40/13; B60W 40/13; B60W 2040/1307; B60W 2420/52; B60W 2300/12; B60W 2300/121; B60W 2550/14; B60W 2556/50; B60W 2552/15; G01C 11/02; G01C 7/02; B60Y 2200/41; B60Y 2200/145; B60Y 2200/15–16; B60Y 2300/02

USPC .................................................. 701/124, 50
  See application file for complete search history.

(56) References Cited

U.S. PATENT DOCUMENTS

| 2006/0089766 | A1 | 4/2006 | Allard et al. |
| 2008/0208416 | A1* | 8/2008 | Yuet .......................... B60T 7/12 701/50 |
| 2010/0131122 | A1 | 5/2010 | Dersjoe et al. |
| 2011/0022267 | A1 | 1/2011 | Murphy |
| 2012/0209502 | A1 | 8/2012 | Nichols et al. |
| 2014/0046530 | A1 | 2/2014 | Humphrey |
| 2015/0127212 | A1* | 5/2015 | Chacon ................. B60R 21/013 701/32.4 |
| 2016/0170089 | A1* | 6/2016 | Collins ................... G01S 17/89 702/5 |

FOREIGN PATENT DOCUMENTS

| EP | 2273334 A1 | 1/2011 |
| JP | 2009208509 A | 9/2009 |
| KR | 20020006624 | 1/2012 |
| TW | 201227198 A | 7/2012 |

OTHER PUBLICATIONS

European Official Action (dated Jan. 23, 2019) for corresponding European App. EP 15 89 4391.

* cited by examiner

METHOD AND SYSTEM FOR PREDICTING A RISK FOR ROLLOVER OF A WORKING MACHINE

BACKGROUND AND SUMMARY

The invention relates to a method for predicting a risk for rollover of a working machine for load transportation, a control unit for controlling a prediction system for predicting a risk for rollover of a working machine for load transportation, a prediction system for predicting a risk for rollover of a working machine for load transportation, a corresponding computer program, and computer readable medium carrying said computer program.

The invention can for example be applied in heavy-duty load transporting working machines, such as trucks, haulers, articulated haulers, mining trucks and off-road trucks, but also other types of load transporting working machines, such as wheel loaders, backhoe loaders, forest forwarder machine, agricultural vehicles, etc. where the height of the overall centre of mass of the vehicle changes significantly between an empty and fully loaded working machine. Typical types of load are for example gravel, sand, rocks, stones, earth, debris, mining material, logs, forestry products, agricultural products, or the like. Although the invention will be described with respect to an articulated hauler, the invention is not restricted to this particular working machine, but may also be used in other working machines as described above.

There is a desire to prevent any type of load transporting working machine rollover during use of the machine. Load transporting working machine rollover may occur to the side, front or rear, but front and rear rollover is generally less frequent due to load transporting working machines often relatively long wheelbase that results in relatively good working machine longitudinal rollover stability. A rollover risk assessment system for an autopilot-guided agricultural vehicle is known from US 2011/0022267 A1. While this solution may work well in some situations, there is still room in the load transporting working machine field for an improved method for predicting a risk for rollover of a working machine for load transportation.

It is desirable to provide an improved method, control unit and system for predicting of a risk for rollover of a working machine for load transportation.

According to a first aspect of the invention, a method is provided for predicting a risk for rollover of a working machine for load transportation, wherein the method comprising:

obtaining ground topographic data of a geographical area located close to the working machine from a ground topographic detection system;

extracting a ground gradient from the ground topographic data;

obtaining weight information of the load being currently transported by means of an on-board load weighting system or by receiving load information originating from the device that loaded the load being currently transported;

determining a current maximal allowed ground gradient for the working machine based on said weight information; and predicting a risk for working machine rollover if the working machine approaches a geographical area including a ground gradient exceeding or being close to the current maximal allowed ground gradient for the working machine.

The solution enables detection of risk for working machine rollover already before the working machine has entered a potentially dangerous geographical area. Thereby, the method can warn a driver of the working machine before the risk for rollover has become critical, such that the driver and/or working machine control unit well in advance, e.g. even before entering a risk area, can take action to reduce the risk for rollover. The solution is thus advantageous over for example rollover warning systems that merely take current working machine inclination angle, possibly combined with working machine speed and yaw rate, into account for determining a current working machine rollover risk.

The solution is also cost-effective and relatively easily implemented because it is not dependent on prior knowledge of a planned working machine driving path.

The solution is also specifically designed for load transporting working machines, in that it determines a current maximal allowed ground gradient for the working machine based on weight information of the load being currently transported. The solution thus dynamically reacts to changes in working machine load-situation, such that an unloaded working machine may take a certain path without rollover warnings being generated, but a fully loaded working machine taking the same path will cause rollover warnings being generated.

According to a second aspect of the invention, a control unit is provided for controlling a prediction system for predicting a risk for rollover of a working machine for load transportation, the control unit being configured for:

obtaining ground topographic data of a geographical area located close to the working machine from a ground topographic detection system;

extracting a ground gradient from the ground topographic data;

obtaining weight information of the load being currently transported by means of an on-board load weighting system or by receiving load information originating from the device that loaded the load being currently transported;

determining a current maximal allowed ground gradient for the working machine based on said weight information; and predicting a risk for working machine rollover if the working machine approaches a geographical area including a ground gradient exceeding or being close to the current maximal allowed ground gradient for the working machine.

According to a third aspect of the invention, a prediction system is provided for predicting a risk for rollover of a working machine for load transportation, the system comprising:

an on-board load weighting system configured for detecting weight information of the load being currently transported, or a communication unit configured for receiving load information originating from the device that loaded the load being currently transported;

a ground topographic detection system; and an electronic control unit, which is configured for:

obtaining ground topographic data of a geographical area located close to the working machine from the ground topographic detection system;

extracting a ground gradient from the ground topographic data;

obtaining weight information of the load being currently transported from the on-board load weighting system or from the communication unit;

determining a current maximal allowed ground gradient for the working machine based on said weight information; and predicting a risk for working machine rollover if the working machine approaches a geographical area including a ground gradient exceeding or being close to the current maximal allowed ground gradient for the working machine.

The solutions according to the second and third aspect of the invention provide the same or corresponding advantages as those described in connection with the first aspect of the invention.

Further advantages and advantageous features of the invention are disclosed in the following description and in the dependent claims.

According to some of the example embodiments, the working machine is an articulated hauler or mining truck. These types of working machines are particularly suitable for having the invention implemented due to their frequent use in open and relatively hilly terrain, as well as their large load transporting capability. The open and relatively hilly terrain, such as typically available in mining areas, allows a driver of a working machine to relatively freely select an appropriate driving path for driving the working machine between two locations, without necessarily following a predetermined road or the like. This situation requires relatively high knowledge and experience from the working machine driver to correctly assess the risk for rollover, taking in particular weigh of the load into account. In such circumstances, the method offers real benefit and enables use of also less experienced drivers.

According to some of the example embodiments, the working machine comprises a load carrying attachment that is liftable in the vertical direction by means of hydraulically controlled pivotal linkage mechanism. The method further comprising: obtaining lift position of a load carrying attachment; and determining the current maximal allowed ground gradient for the working machine taking also into account information about current lift position. Working machines having a load carrying attachment that is liftable in the vertical direction by means of hydraulically controlled pivotal linkage mechanism tend to be driven between two locations not only with their load carrying attachment in a lower region but sometimes with their load carrying attachment in an upper region of the total lift range. Example working machines having a load carrying attachment that is liftable in the vertical direction by means of hydraulically controlled pivotal linkage mechanism are wheel loaders, back-hoe loaders, or the like. The vertical position of a total centre of mass of a working machine will generally be relatively strongly affected by the lifting position of the load carrying attachment because the only load transported by the working machine is generally the load carried by the load carrying attachment. Taking current lift position into account when determining the current maximal allowed ground gradient will consequently generally result in improved rollover prediction accuracy.

According to some of the example embodiments, the working machine is front end wheel loader.

According to some of the example embodiments, the method comprises predicting a risk for working machine rollover if a current working machine driving direction of the working machine coincides with a geographical position having a ground gradient exceeding or being close to the current maximal allowed ground gradient for the working machine. The ground topographic data provided by the ground topographic detection system may cover a large area close to the working machine, depending for example on the detection capacity of the ground topographic detection system. The relevant ground topographic data for predicting risk for working machine rollover is however mainly the data corresponding to the actual future driving path of the working machine. For example, a steep ditch next to a road may as such exhibit a relatively steep ground gradient, but the risk for rollover is however low as long as the working machine remains on the road. One approach for providing more relevant rollover risk prediction consequently involves predicting a future driving path and analysing the ground gradient along that driving path. All ground topographic data falling outside the predicted future driving path may be given less weight or completely disregarded. One example approach for predicting the future driving path is to assume that the working machine follows the current working machine driving direction. Following this approach, mainly the geographical position coinciding with the current working machine driving direction of the working machine are relevant for predicting rollover risk.

According to some of the example embodiments, the method comprises: determining a slope direction at the location of the extracted ground gradient; determining a relative angle between the slope direction and the current driving direction of the working machine; determining a current maximal allowed ground gradient for the working machine based on said weight information and the determined relative angle; and predicting a risk for working machine rollover if the working machine approaches a geographical area including a ground gradient exceeding or being close to the current maximal allowed ground gradient for the working machine. Working machines adapted for load transportation generally have a length significantly exceeding the width of the machine, and this relationship tends to be valid for nearly all types of working machines. As a result, the risk for working machine rollover to the side is typically higher than rollover to the front or rear. Consequently, for more accurately predicting the risk for rollover the driving direction of the working machine should be taken into account in the prediction calculation. Thereby, the true inclination of the working machine when passing a geographical area can be more accurately predicted, and the risk for rollover can be better predicted. For example, passing a geographical spot with high ground gradient in a slope direction parallel with a driving direction implies that only front or rear rollover may occur, but when passing the same geographical spot in a driving direction perpendicular to the slope direction implies that only side rollover may occur, and as discussed previously, the threshold for side rollover is generally much lower that the threshold for front or rear rollover.

According to some of the example embodiments, the method comprises predicting a future driving path of the working machine; and predicting a risk for working machine rollover if the predicted future driving path includes a ground gradient exceeding or being close to the current maximal allowed ground gradient for the working machine. As mentioned above, mainly the ground gradient in the area of the future driving path is relevant for predicting working machine rollover.

According to some of the example embodiments, the method comprises predicting the future driving path of the working machine based on at least the current working machine driving direction. As mentioned above, knowledge of a predicted future driving path may result in improved prediction accuracy.

According to some of the example embodiments, the method comprises detecting a road section in the ground topographic data; and predicting the future driving path of the working machine based at least on the detected road section. If a road can be detected in ground topographic data it may be assumed that the working machine may tend to follow this road. Detection of a road may for example by performed be detecting the typical characteristics of a road, such as a relatively flat surface having a significantly longer extension in a length direction of the road than a width direction of the road. Possibly, other typical characteristics of a road may include ditch characteristics on one or two sides of the road can be detected, thereby further giving strength to the prediction. Possibly, other typical characteristics of a road may include a significantly rougher terrain in the area outside the predicted road section. Other typical characteristics of a road may exist.

According to some of the example embodiments, the method comprises predicting the future driving path of the working machine based at least on data of historical driving paths of the working machine in the present geographical area, and/or on data of historical driving paths of other similar working machines in the present geographical area. The data of historical driving paths of the present working machine, or of other similar working machines in the present geographical area, may be based on pattern recognition of the ground topographic data of the geographical area close to the working machine. A subsequent working machine could thus possibly recognise the present ground topography and assume that the driver will tend to drive along the same driving path as last time the working machine passed the actual geographical location.

According to some of the example embodiments, the method comprises predicting also the working machine speed and/or working machine acceleration along the predicted future driving path of the working machine; and determining current maximal allowed ground gradient for the working machine based on both said weight information and the predicted working machine speed and/or working machine acceleration along the predicted future driving path.

Both the working machine speed and working machine acceleration influences the risk for rollover due to the dynamic behaviour of the working machine during driving. Working machine speed is a component for calculating a lateral force F acting a working machine having a mass m and driving through a curve having a radius r according to $$F = \frac{mv^2}{r}.$$

The lateral force F acts at the centre of mass of the working machine and towards a radially outer side of the curvature, such that a sideways rollover torque M is induced according to M=F·D, here D is the vertical height of the centre of mass above ground. A working machine passing a certain curve with high speed consequently has a higher risk of sideways rollover compared with a working machine passing said curve with low speed. The accuracy of the rollover risk prediction will thus generally improve if the prediction calculation also includes this rollover torque. The radius will be derivable from the predicted future driving path of the working machine.

According to some of the example embodiments, the method comprises: determining a slope direction at the location of the extracted ground gradient; predicting a driving direction of the working machine at the ground gradient area associated with the extracted ground gradient based on the predicted future driving path; determining a relative angle between the slope direction and the driving direction of the working machine along the predicted future driving path; and determining a current maximal allowed ground gradient for the working machine based on said weight information and the determined relative angle. As discussed above, for more accurately predicting the risk for rollover both the driving direction of the working machine and the slope direction at the area of the ground gradient should be taken into account in the rollover risk prediction calculation.

According to some of the example embodiments, the step of predicting a future driving path of the working machine is restricted to predicting a near future driving path of the working machine; and the step of warning the driver is restricted to warning the driver for a near future risk for working machine rollover if the predicted near future driving path includes a ground gradient exceeding or being close to the current maximal allowed ground gradient for the working machine. Since the accuracy of the prediction of the future driving path decreases with the length of the predicted future driving path may be advantageous omitting prediction of the future driving path too long into the future due, since the error rate increases correspondingly. It may thus be advantageous to only predict a near future driving path for maintaining a high prediction accuracy. Some level of prediction is however in most cases necessary for delivering a more useful guidance than simply providing the working machine with inclinometers detecting current working machine inclination angle. In addition, the size of the geographical area that may be properly analysed by the ground topographic detection system is generally rather limited due limitations in terms of detection resolution and physical limitations, such as the impossibility to "see behind" a crest. Prediction of only the near future driving path is consequently also consistent with the capability of the ground topographic detection system.

According to some of the example embodiments, the step of predicting a near future driving path is restricted to predicting a future driving path within a range of 5-300 metres from the working machine, specifically within the range of 5-200 metres, and more specifically within the range of 5-100 metres. Within these type of ranges, a sufficiently high accuracy both in terms of prediction of future driving path and ground gradient may be obtained for enabling a reasonable basis for predicting risk for rollover.

According to some of the example embodiments, the working machine is configured to be driven by a physical driver located in a driver's cabin of the working machine, or wherein the working machine is configured to be remote controlled by a physical driver. The disclosure is mainly concerned with prediction of risk for rollover when a human operator controls the working machine.

According to some of the example embodiments, the method comprises warning the driver if a risk for working machine rollover has been predicted. Thanks to the warning the driver can well in advance change route for avoiding any risk for rollover.

According to some of the example embodiments, the method comprises alerting an autopilot of the working machine if a risk for working machine rollover has been predicted. In cases when the working machine is operated on autopilot, warnings to a driver might be insufficient. In such cases, the autopilot itself may advantageously be alerted for taking the necessary action to reduce the risk for rollover. Moreover, in cases the working machine is human operated but the warnings are deemed insufficient, the autopilot may be alerted to actively prevent the driver from driving into a rollover risk area, for example by decreasing the speed, activating the working machine brakes, controlling the steering, or the like.

According to some of the example embodiments, the ground topographic detection system is positioned on the working machine. This arrangement may be deemed advantageous in terms of a defining a self-contained system and method for predicting a risk for rollover of a working machine. No data of a specific site must first be collected and transmitted to the working machine. Moreover, by having the ground topographic detection system is positioned on the working machine the system and method may predict the risk for rollover of the working machine based on updated topographic map data, and there is also no absolute need for a global positioning system for navigating the working machine. An on-board carried ground topographic detection system enables real-time observation data of the topographic state, which might be advantageous particularly in relatively quickly changing topographic landscapes, such as for example in mining sites and stone extraction sites. The risk that the method and system is relying on old and outdated topographic data is thus reduced.

According to some of the example embodiments, the ground topographic detection system is selected from the group consisting of stereo vision camera system, a lidar system, a radar system, or combinations thereof.

According to some of the example embodiments, the ground topographic detection system positioned on the working machine is the only means used for obtaining ground topographic data of the geographical area located close to the working machine. The omission of predetermined mapped topographic data and GPS system for prediction rollover risk makes the method less complex and more cost-effective.

According to some of the example embodiments, the ground topographic detection system is positioned on an unmanned aerial vehicle. This approach enables detection and collection of ground topographic data of a relatively large geographical area, which data subsequently may be forwarded to a working machine operating in the geographical area.

Thereby, the rollover risk prediction system and method is less dependent on sufficient detection range of a ground topographic detection system that is positioned on the working machine. The detection may further be performed in optimal conditions, such as day time with no clouds or rain that may reduce the topographic detection accuracy. The ground topographic detection system positioned on the unmanned aerial vehicle may be selected from the group consisting of a single camera system, stereo vision camera system, a lidar system, a radar system, or combinations thereof.

According to some of the example embodiments, the method comprises generating a 3D ground topographic map based on the ground topographic data. Having an entire 3D map available does not only enable improved prediction of the risk for rollover. For example, one or more isolated large ground gradients within a geographical area close to the working machine may generally be deemed reflecting less risk for rollover compared with a large area having large ground gradient, because the possibility of driving past the large gradient area is smaller. Moreover, the map may be used for improved display of the rollover risk over the geographical area close to the working machine. The map may for example be displayed on a computer display or head-up display or the like, where the risk for working machine rollover is marked in the displayed map. The risk may for example be shown as "high risk" or "low risk" areas, or a more detailed map with gradual degree of rollover risk may be shown to the driver.

A computer program comprising program code means for performing the steps of the method when said program is run on a computer.

A computer readable medium carrying a computer program comprising program code means for performing the steps of any of the method when said program product is run on a computer.

The disclosure also includes a working machine comprising the prediction system defined above.

Also the control unit and prediction system defined above may benefit from features described above.

Further areas of applicability will become apparent from the description provided herein.

BRIEF DESCRIPTION OF THE DRAWINGS

With reference to the appended drawings, below follows a more detailed description of embodiments of the invention cited as examples.

In the drawings.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
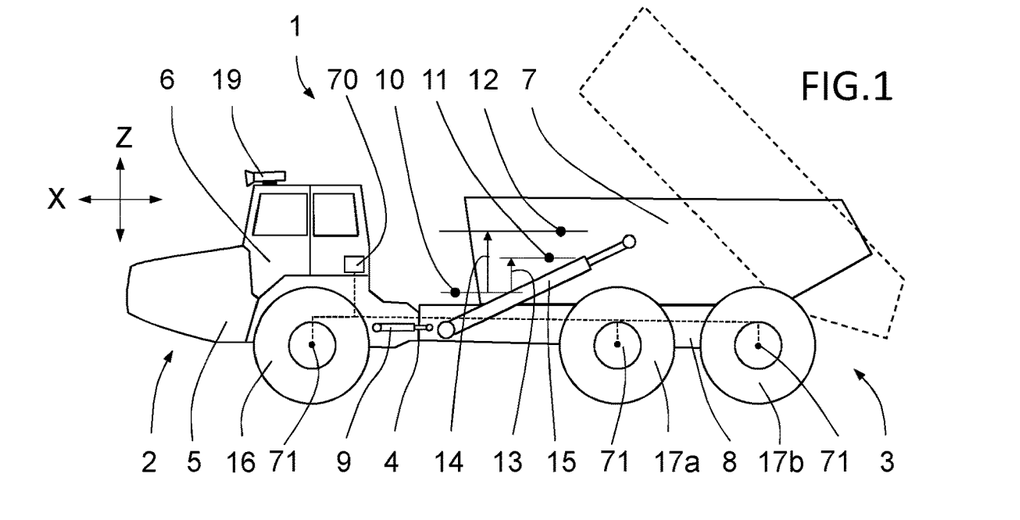
FIG. 1 shows a working machine suitable for load transportation having a tiltable dump body.

With reference to FIG. 1 of the drawings, the invention will be described with reference to a load transporting working machine 1 in form of an articulated hauler having a tractor unit 2 that is articulated connected to a trailer unit 3 at an articulated joint 4. The working machine has a longitudinal extension in a longitudinal direction X of the machine, and a vertical extension in a vertical direction Z of the machine The engine and driver's cabin 6 is provided at the tractor unit 2 and a tiltable load carrying attachment 7, also referred to as dump body, is mounted to a frame 8 of the trailer unit 3. The dump body 7 is preferably pivotally connected to a rear section of the trailer unit 3 and tiltable by means of a pair of tilting cylinders 15, for example hydraulic cylinders. The tractor unit 2 has a frame 5 and a pair of front wheels 16 suspended from the frame 5. The trailer unit 3 has two pair of rear wheels 17a, 17b suspended from the frame 8.

The working machine is frame-steered by means of the articulated joint 4 connecting the tractor unit 2 and the trailer unit 3. The articulated joint 4 enables the tractor unit 2 and the trailer unit 4 to pivot around a substantially the vertical direction Z of the machine. The working machine preferably comprises a hydraulic system having two hydraulic steering cylinders 9 arranged on opposite sides of the working machine 1 for turning the working machine by means of relative movement of the tractor unit 2 and the trailer unit 3. The hydraulic cylinders 9 can, however, be replaced by any other linear actuator for steering the machine, such as an electromechanical linear actuator.

The articulated joint 4 is generally further configured for enabling mutual rotation of the tractor unit 2 and the trailer unit 3 around the longitudinal direction X of the machine 1. Hereby, the machine 1 is able to manage the rough terrain that is often associated with construction sites. The wording "mutual rotation" should be understood to mean that the tractor unit 2 is able to rotate or pivot relative to the trailer unit 3, and vice versa.

A ground topographic detection system positioned 19 is provided on the working machine, for example positioned on the roof of the driver's cabin as shown in FIG. 1, or within the driver's cabin for a more protected installation. The ground topographic detection system 19 may for example comprise a stereo vision camera system including two transversally spaced apart camera devices, a lidar system, a radar system, or combinations thereof.

A stereo vision camera system is advantageous amongst others in terms of cost, resolution and distance. The hardware cost associated with each camera of a stereo vision camera system is relatively low due to the rapid technological progress of digital cameras and image sensors. Also the resolution has drastically improved during the last decade enabling high resolution stereo vision camera systems, such that the detection range is relatively good. In addition, cameras can detect colours thereby further enhancing the accuracy. The overall performance of a stereo vision camera system is however greatly dependent on the computer program used for deriving ground topographic data from the output signals of the cameras. Moreover, the performance of a stereo vision camera system is very much dependent on the current exterior light conditions A lidar system includes a light emitting device, such as a laser, and a light detection device for detecting light emitted by the light emitting device and which have returned to the lidar system after having been reflected on a surface. By calculating the time period between emission and detection of reflected light and distance to the object can be determined. A radar system functions in a similar manner as the lidar system but using electromagnetic radiation instead of light for detecting distance to an object the reflects the transmitted radiation. Lidar systems use emitted light, and radar systems used emitted radiomagnetic energy, so both these systems operate pretty much independently of the ambient light conditions. However, lidar and radar systems are generally relatively costly in terms of hardware and the resulting resolution is generally not as high as provided by a stereo vision camera system.

The provision of the ground topographic detection system for real-time generation of topographic data enables rollover risk prediction being based on fresh data, thereby eliminating the risk for erroneous rollover risk prediction due to recently changed topographic conditions. This feature is particularly advantageous at working sites having frequently changes in the topographic conditions, because at such working sites predetermined topographic data quickly becomes incorrect. Furthermore, since the method and system does not rely on use of predetermined topographic terrain data, the cost for acquiring that data, and keeping that data updated, can be saved.

The dump body is shown in solid lines at the lower position suitable for being loaded and for subsequent load transportation. The dump body is also shown in dotted lines at the raised and tilted position, which is used for unloading any load stored in the dump body. Displacement of the dump body from the lower position 10 the raised position is generally performed by means of hydraulic cylinders 15 installed between the frame 8 and dump body. The heavy duty hauler 1 typically comprises all-wheel drive for being suitable for transporting large loads over rough terrain.

The centre of mass of the working machine 1 changes significantly when receiving a load in the dump body because the load stored in the dump body may very well have a larger weight than the entire working machine 1 in an unloaded state. In FIG. 1, a first position 10 of the centre of mass is schematically shown for an empty working machine, a second position 11 of the centre of mass is schematically shown for a fully loaded working machine, and a third position 12 of the centre of mass is schematically shown for an empty working machine having its dump body in a raised and tilted position, i.e. the position for unloading. These positions 10, 11, 12 are merely example positions and each type of working machine has individual positions.

The displacement of the centre of mass from the first position 10 to the second position 11 upon loading of the working machine results in a vertical displacement of the centre of mass upwards with a first length 13, as well as a horizontal displacement towards the rear of the working machine 1. The displacement is entirely caused by the large weight of the load that may be carried in the dump body.

During unloading of the load, the dump body is raised and the load is tipped to the ground behind the working machine 1. In the raised position, the mass of the empty dump body causes the centre of mass of the working machine to displace to the third position 12, which results in a vertical displacement of the centre of mass upwards with a second length 14, compared with the first position 10. There is also a horizontal displacement of the centre of mass towards the rear of the working machine 1. The displacement is caused by the tilting of the dump body.

Figure 2:
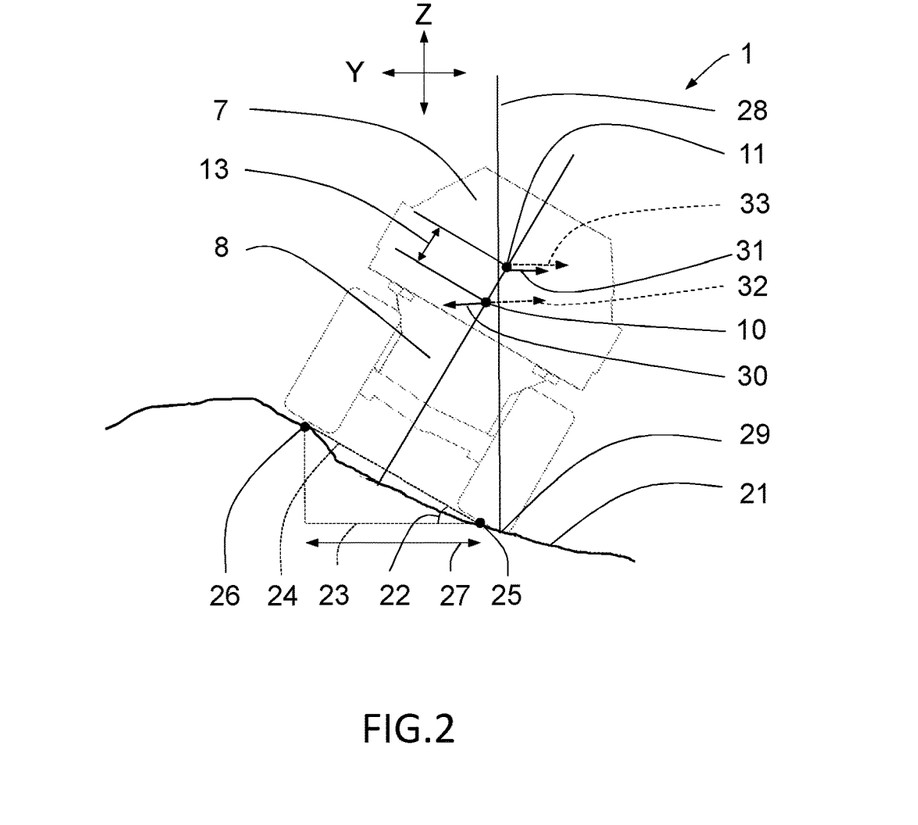
FIG. 2 shows a working machine traversing a large gradient area.

The effect of the vertical displacement of the centre of mass on rollover risk is schematically illustrated in FIG. 2, which shows an articulated hauler 1 similar to FIG. 1 from the rear. The working machine has a transverse extension in a transverse direction Y of the machine 1. The working machine 1 is position on an uneven ground 21 at a location with a certain ground gradient 22, defines by a first ground point 25 and a second ground point 26. The slope direction at the location of the ground gradient 22, which is defined by a line crossing both the first and second ground points 25, 26, is here perpendicular to a longitudinal direction of the working machine 1, such that a certain risk for sideways rollover of the working machine is present.

The ground gradient 22 may be calculated with a variable degree of accuracy. In principle, the ground gradient between two spaced apart ground points may be calculated based on a ground level elevation difference between the two ground points, and a horizontal distance between the two ground points. The accuracy of the calculated ground gradient is not only dependent on the accuracy of the ground topographic measurement data, but also on the level of equalisation of smaller irregularities in the ground surface.

For example, the ground gradient may be calculated based on a horizontal distance 27 of about 3 metres, which correspond to about the wheelbase of a heavy duty working machine. Such a calculation is illustrated in FIG. 2, where the ground gradient 22 at an area having a first ground point 25 and a second ground point 26 is calculated. A straight ground line 24 connecting the first and second ground points 25, 26 and the horizontal plane 23 jointly define the ground gradient 22 for the area, which area in the illustrated example is located under the working machine 1. Depending on the type of working machine, the expected type of ground conditions at the working site, etc., another value for the horizontal distance 27 may be selected. A smaller distance than the wheelbase of the expected working machine does not appear relevant. Using larger distances, such as for example in the range of 4-20 meters, or more, provide a certain equalisation of smaller irregularities in the ground surface, if this is desired. Furthermore, a larger distance also results in reduced data processing capacity requirement.

The effect of loading on the rollover risk is illustrated in FIG. 2. Both the first position 10 of the centre of mass corresponding to an empty working machine and the second position 11 of the centre of mass corresponding to a fully loaded working machine are schematically shown in FIG. 2. A vertical line 28 is included in FIG. 2 crossing the contact point 29 between the ground 21 and an outer edge of the lower wheel. This contact point 29 represents the pivoting point around which the working machine will tilt sideways in case of rollover towards the right hand side in FIG. 2. For a static working machine rollover will occur when the total centre of mass of the working machine including any load to be transported is located on the right hand side of the vertical line 28 in FIG. 2. In the example showed, the empty working machine will not rollover sideways because the first position 10 of the centre of mass is located on the left hand side of the vertical line 28, such that a first force 30 acting against the rollover is provided. However, a fully loaded working machine will rollover sideways because the second position 11 of the centre of mass is located on the right hand side of the vertical line 28, such that a second force 31 acting to induce a rollover is provided. Consequently, this example clearly shows that the loading state of the working machine is very important when determining the risk for rollover.

The previous illustration concerns the static working machine. If the working machine is also turning working machine dynamics may be additionally taken into account for improving the accuracy of the rollover prediction. Working machine speed is a component for calculating a lateral force F acting a working machine having a mass m and driving through a curve having a radius r according to $$F = \frac{mv^2}{r}.$$

The lateral force F acts at the centre of mass of the working machine and towards a radially outer side of the curvature, such that a sideways rollover torque M is induced according to M=F·D, where D is the vertical height of the centre of mass above ground. If we assume that the working machine in FIG. 2 is not stationary but instead is turning towards the left, a lateral force (dotted in FIG. 2) will be generated towards the right in FIG. 2. In the illustrated example, for an empty working machine having the centre of mass at the first position 10, the first lateral force 32 is assumed to be larger than the first force 30 caused by gravity. As a result also the empty working machine will start to rollover in the present situation. The fully loaded working machine having the centre of mass at the second position 11 will with most likely rollover since both the second force 31 and second lateral force 32 jointly act to make the working machine rollover sideways. As a result both the empty and fully loaded working machine will start to rollover in the present situation. Consequently, this example clearly shows that also the driving behaviour may influence the risk for rollover.

Figure 3:
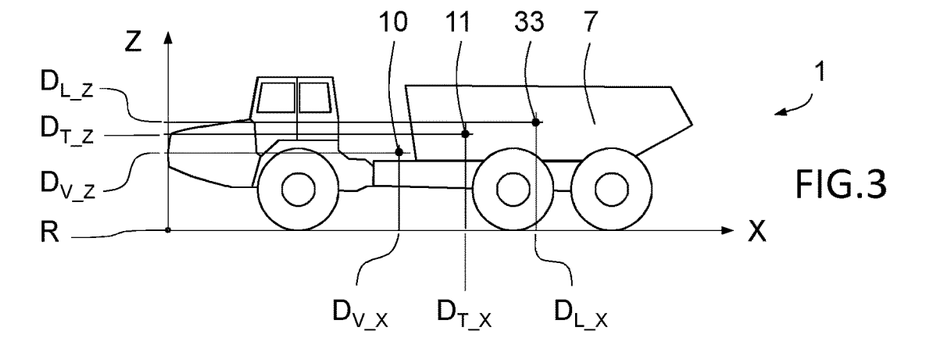
FIG. 3 shows how the centre of mass varies with loading state of a working machine.

The location of the total centre of mass of the working machine including any load is a relevant parameter for predicting the risk for rollover. With reference to FIG. 3, the location 11 of the total centre of mass in X and Z direction $D_{T\_X}$, $D_{T\_Z}$ can be predicted by knowing the weight $M_V$ and the position 10 of the centre of mass of the unloaded working machine in terms of distances $D_{V\_X}$, $D_{V\_Z}$ from a reference point R to the centre of mass of in X and Z direction, and by knowing the weight $M_L$ and the position 33 of the centre of mass of the load carried by the dump body in terms of distances $D_{L\_X}$, $D_{L\_Z}$ from a reference point R to the centre of mass of the load in X and Z direction, and by knowing the total weight $M_T$ of the working machine including the load according to:

$$D_{T\_X} = \frac{1}{M_T}(M_V \cdot D_{V\_M} + M_L \cdot D_{L\_X})$$

$$D_{T\_Z} = \frac{1}{M_T}(M_V \cdot D_{V\_Z} + M_L \cdot D_{L\_Z})$$

The weight My and the distances $D_{V\_X}$, $D_{V\_Z}$ representing the position 10 of the centre of mass of the unloaded working machine may be predetermined. The position 33 of the centre of mass of the load carried by the dump body in terms of distances $D_{L\_X}$, $D_{L\_Z}$ may for example be assumed being located in the centre of the dump body in X direction and gradually increasing in the vertical direction Z starting from the bottom of the dump body towards the centre of the dump body in Z direction for a fully loaded dump body.

One example solution for obtaining the desired weight information of the load $M_L$ being currently transported and the weight of the total machine $M_T$ is to provide the working machine with an on-board load weighting system 70. Such a system may for example have a pressure sensor 71 at a hydraulic suspension or air suspension of each wheel of the working machine for determining the force carried by each wheel. The total weight $M_T$ of the working machine, including any load, may then be calculated by simply calculating the total force carried by all wheels. The weight of the load $M_L$ may thereafter be derived from $M_L=M_T-M_V$. Instead of measuring a pressure of a working fluid of a hydraulic or air suspension system, such as when the working machine does not have such suspension system, the air pressure within one or more, preferably each, wheel may be measured instead. Still more alternatively, if for example a mechanical suspension system is used instead of a hydraulic or air suspension system, the level of suspension compression may instead be detected by means of a position sensor located at each wheel for detecting current load condition. Yet another approach for measuring load weight $M_L$ is to detect a hydraulic pressure in a hydraulic system used for moving the dump body. This approach is particularly advantageous for working machines comprising a load carrying attachment that is liftable in the vertical direction by means of hydraulically controlled pivotal linkage mechanism, such as wheel loader, or the like.

As mentioned above, the position 33 of the centre of mass of the load carried by the dump body may be assumed being located in the centre of the dump body in X direction and gradually increasing in the vertical direction Z starting from the bottom of the dump body towards the centre of the dump body in Z direction for a fully loaded dump body. However, for even more accuracy, the load distribution between individual wheels of the working machine may be used for predicting a more exact distribution of the load carried by the dump body. For example, a single heavy object, such as a large rock, may be located and secured in a front section of the dump body. The load distribution of such a load would differ from a more spread out load, such as caused when transporting sand or the like. Consequently, be analysing the load distribution at all wheels, and also the weight of the load, an even more accurate prediction of the position $D_{L\_X}$, $D_{L\_Z}$ of the centre of mass of the transported load may be obtained.

Furthermore, in circumstance where the working machine comprises a load carrying attachment that is liftable in the vertical direction by means of hydraulically controlled pivotal linkage mechanism, such as wheel loader, or the like, the total centre of mass of the working machine including any load should take the vertical position of the load carrying attachment into account. The method may thus involve obtaining lift position of a load carrying attachment, and subsequently determining the current maximal allowed ground gradient for the working machine taking also into account information about current lift position.

A control unit may be configured to read the output signals from one or more sensors that detect parameters relevant for obtaining weight information of the load being currently transported. Alternatively, the control unit may configured for receiving load information about the load being currently transported from the device that loaded the working machine. For example, if a wheel loader was used for loading the articulated hauler 1, the wheel loader might have a load detection system that detects the load of the bucket. Thereby, the wheel loader could after finished loading of the articulated hauler for example wirelessly communicate to the weight of the load to the articulated hauler 1.

With knowledge of the load being currently transported, the control unit may determine at least the vertical height $D_{T\_Z}$ above ground of the total centre of mass of the working machine, but possibly also the position $D_{T\_X}$ of the centre of mass in a longitudinal direction X of the working machine. This may be performed by means of a mathematical equation or reading a predetermined map. Thereafter, with knowledge of the total mass and the position of the total centre of mass of the working machine, the control unit may be configured to determine the current maximal allowed ground gradient for the working machine.

Additional complexity for determining current maximal allowed ground gradient for the working machine may arise when the working machine can no longer be modelled as a rigid body. Indeed, the articulated joint 4 described previously with reference to FIG. 1 showing the load transporting working machine 1 in form of an articulated hauler is configured for enabling mutual rotation of the tractor unit 2 and the trailer unit 3 around the longitudinal direction X of the machine 1. As a result, the tractor unit 2 or trailer unit 3 may rollover separately. Consequently, either trailer unit 3 or the tractor unit 2 may rollover and land on the side causing damage to the working machine 1 as well as being dangerous for the operator. The current maximal allowed ground gradient for the working machine may thus have to be determined separately for the tractor unit 2 and trailer unit 3.

Moreover, as will be discussed more in detail with reference to FIGS. 5 and 6 below, for more accurately predicting the risk for rollover a predicted relative angle between the slope direction and a driving direction of the working machine should be taken into account in the rollover risk prediction calculation. When adopting this aspect on a working machine having an articulated joint 4 enabling mutual rotation of the tractor unit 2 and the trailer unit 3 around the longitudinal direction X of the machine 1, the prediction may have to performed on each unit 2, 3, separately, i.e. the relative angle between the slope direction and a driving direction of the tractor unit 2 should be taken into account in the rollover risk prediction calculation, and/or the relative angle between the slope direction and a driving direction of the trailer unit 3 should be taken into account in the rollover risk prediction calculation.

The current maximal allowed ground gradient for the working machine may corresponds to the maximal ground gradient that can be passed by the working machine without rolling over. When subsequently predicting a risk for working machine rollover, various alternative strategies may be selected. For example, the control unit may predict a risk for rollover if the working machine approaches a geographical area including a ground gradient exceeding the current maximal allowed ground gradient for the working machine. Adopting this strategy will however mean that ground gradients very close to the current maximal allowed ground gradient will not be predicted as a risk, and no warning or similar measures will be issued.

According to an alternative strategy, the control unit may for example predict a risk for rollover if the working machine approaches a geographical area including a ground gradient being close to the current maximal allowed ground gradient for the working machine. This strategy will result in prediction of a risk for rollover also for ground gradients close to the current maximal allowed ground gradient but not necessarily exceeding the current maximal allowed ground gradient. This strategy consequently may be deemed to be more robust against errors in calculation of maximal allowed ground gradient and errors in ground gradient detection.

It is also possible to have a gradual continuous or stepwise risk prediction for rollover, where ground gradients being not close to the current maximal allowed ground gradient does not generate any prediction of risk for rollover, where ground gradients being close to the current maximal allowed ground gradient but not exceeding the same generates a prediction of risk for rollover, and where ground gradients exceeding the current maximal allowed ground gradient generates a prediction of high risk for rollover. The level of risk can of course be divided into even more risk levels.

The term "being close to the current maximal allowed ground gradient" may for example include ground gradients in the range of 60-100% of the current maximal allowed ground gradient, specifically in the range of 70-100% of the current maximal allowed ground gradient, and more specifically in the range of 80-100% of the current maximal allowed ground gradient.

Figure 9:
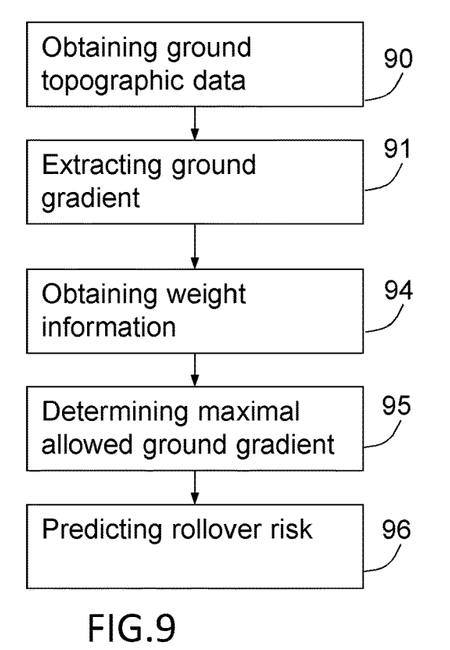
FIG. 9 shows a flow chart of the method according to an example embodiment.

The functionality of the method and system for predicting a risk for rollover of a working machine for load transportation will now be described with reference to FIG. 4 that schematically shows a load transporting working machine 1 driving along a driving direction 41 in an uneven terrain 40, and with reference to FIG. 9 that depicts the main steps according to one example embodiment of the method. The terrain 40 in FIG. 4 may for example represent a mining site, or the like. In a first step 90, a ground topographic detection system 19 positioned on the working machine 1 is operated for obtaining ground topographic data of a geographical area 42 located close to the working machine. The geographical area 42 is shown located merely in front of the working machine in FIG. 4 but this merely represents one possible coverage. It would alternatively have been possible to obtain ground topographic data of a larger or smaller geographical area, for example an area located on another side of the working machine. Moreover, the size of the geographical area 42 may be selected according to the requirements, where a large geographical area 42 generally requires a better but also more costly ground topographic detection system 19. The boundary of the geographical area 42 may for example be set according to an estimated or factual reliability of the obtained ground topographic data.

The ground topographic data may for example comprise individual ground surface coordinates X, Y, Z for a set of locations in the geographical area 42. The obtained ground topographic data generated by the ground topographic detection system 19 may be transformed from a working machine carried coordinate system into individual ground surface coordinates X, Y, Z of for example a geodetic coordinate system using knowledge of the current angular position of the working machine 1, for example by means of inclinometers or accelerometers positioned on the working machine.

In a second step 91, a ground gradient is extracted from the ground topographic data. In the illustration of FIG. 4, a plurality of ground gradients 22a, 22b, 22c representing many different locations are extracted for obtaining a better overview of the ground slope conditions within the geographical area 42. In general, the more ground gradients that are known within the geographical area 42 the better can the method and system predict the risk for rollover. In the schematic example of FIG. 4, the ground gradients 22c on the right hand side of the geographical area 42 are generally larger, when viewed from the working machine 1.

In a third step 94, weight information of the load being currently transported is obtained. As discussed previously, the weight information may for example be obtained by means of an on-board load weighting system or by receiving load information originating from the device that loaded the load being currently transported.

In a fourth step 95, a current maximal allowed ground gradient is determined for the working machine based on the obtained weight information. As discussed previously, many alternative approaches are available for determining a current maximal allowed ground gradient, for example by only considering working machine static behaviour, or also taking working machine dynamic behaviour into account.

In a fifth step 96, a risk for working machine rollover is predicted if the working machine approaches a geographical area 42 including a ground gradient exceeding or being close to the current maximal allowed ground gradient for the working machine. As discussed above, various alternative strategies may be selected for predicting risk for working machine rollover.

Figure 4:
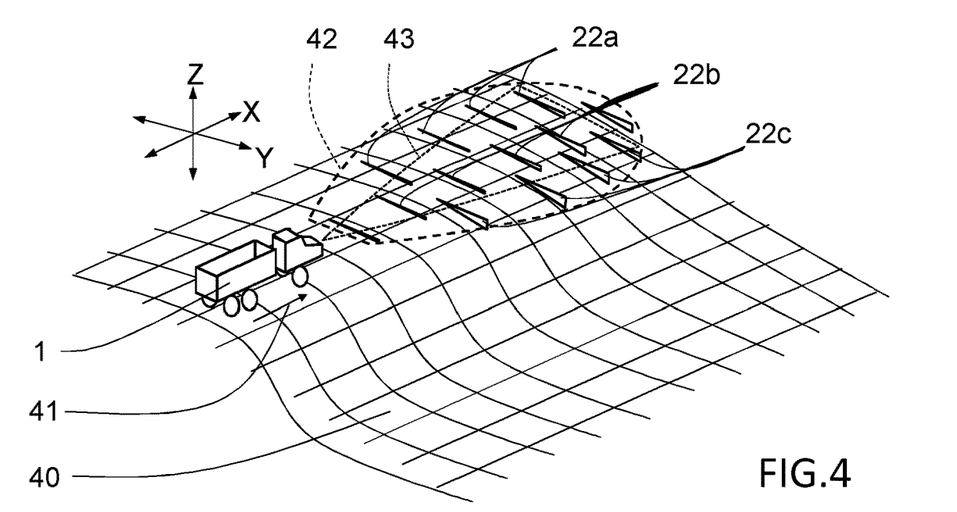
FIG. 4 shows a working machine having a ground gradient detection system.

Furthermore, if a plurality of different ground gradients 22a, 22b, 22c have been detected within the geographical area 42 the working machine is approaching, as illustrated in FIG. 4, the method should preferably have a routine for selecting which ground gradient should be used as basis when determining the risk for rollover. One straight-forward approach is to use the largest identified ground gradient within the geographical area 42. This approach may however result in generation of many less relevant predictions because the working machine will possibly never pass the location within the area 42 having the largest ground gradient. This is particularly true if the largest ground gradient is located far away from a driving direction of the working machine. This approach might thus provide predictions that a driver will not take very seriously.

One alternative approach for obtaining a more relevant rollover prediction may thus involve predicting a risk for working machine rollover if a current working machine driving direction 41 of the working machine coincides with a geographical position having a ground gradient exceeding or being close to the current maximal allowed ground gradient for the working machine. Following this approach, only the centrally located ground gradients 22b in FIG. 4 would possibly be taken into account when predicting rollover risk. This approach provides a much more relevant rollover prediction because it is not unlikely that the working machine will actually pass one or more of the ground gradients 22b on FIG. 4, based in the present working machine driving direction 41. However, this approach might fail providing prediction of rollover risk for large ground gradients located just outside the present driving direction 41.

Still one alternative approach for selecting appropriate identified ground gradients may involve selecting the largest detected ground gradient within a limited geographical area 43, which may be smaller than the geographical area 42 for which ground topographic data was obtained but larger than merely the present working machine driving direction. In FIG. 4, such a limited geographical area 43 has been illustrated having a conical shape but many alternative shapes, sizes and dimension are possible within the scope of the disclosure. This approach could result in more relevant rollover prediction but without failing to identify risk for ground gradients located just outside the present working machine driving direction.

For further improving the accuracy of the rollover risk prediction the relative angle between the slope direction and driving direction of the working machine should be taken into account, because the most working machines have different maximal allowed ground gradients against rollover towards the sides and towards the front or rear. In fact, most working machines have a lower threshold against sideways rollover than front or rear rollover. Consequently, a slope having a certain ground gradient may be traversed without problem if driving parallel with the slope direction, but would result in a sideways rollover of the working machine if traversed when driving perpendicular to the slope direction.

Figure 10:
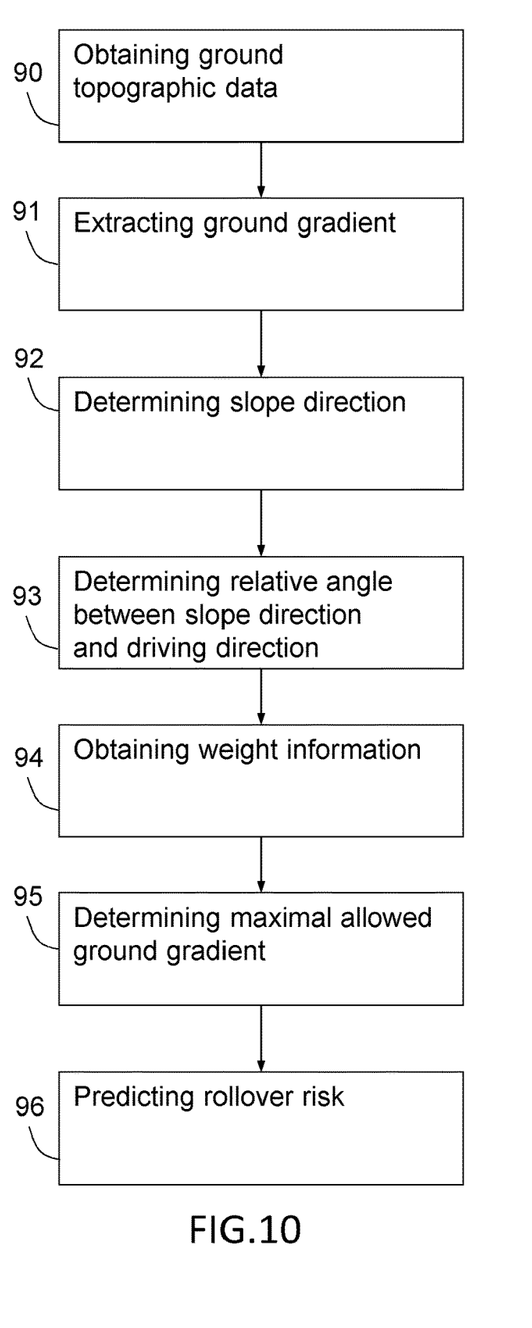
FIG. 10 shows a flow chart of the method according to a further example embodiment.

This functionality of the method and system will now be described with reference to FIG. 5 and FIG. 6 which schematically show a load transporting working machine 1 driving along a driving direction 41 in an uneven terrain 40, and with reference to FIG. 10 that depicts the main steps according to one example embodiment of the method. In FIG. 5, the working machine 1 approaches a sloping area at an angle to a sloping direction 44.

Figure 5:
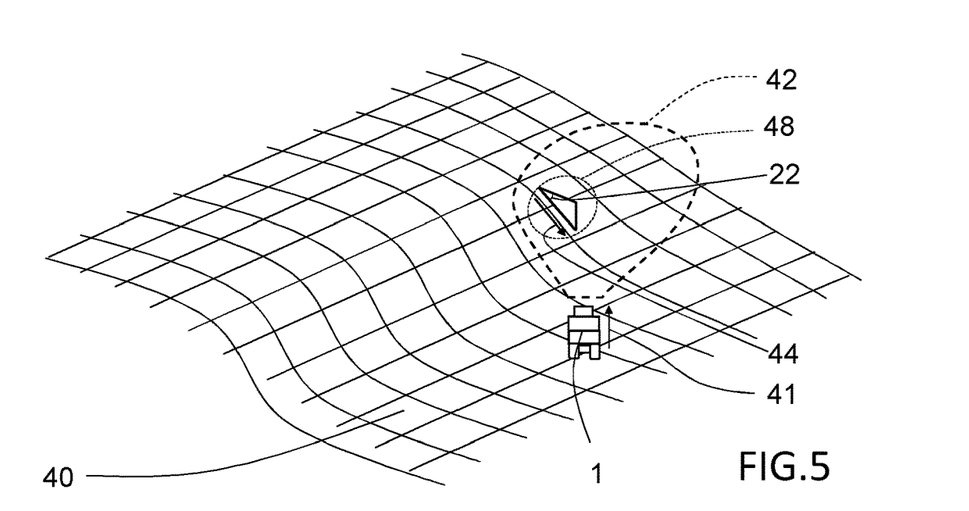
FIG. 5 shows a working machine approaching a relatively large gradient at an angle to the slope direction.
Figure 6:
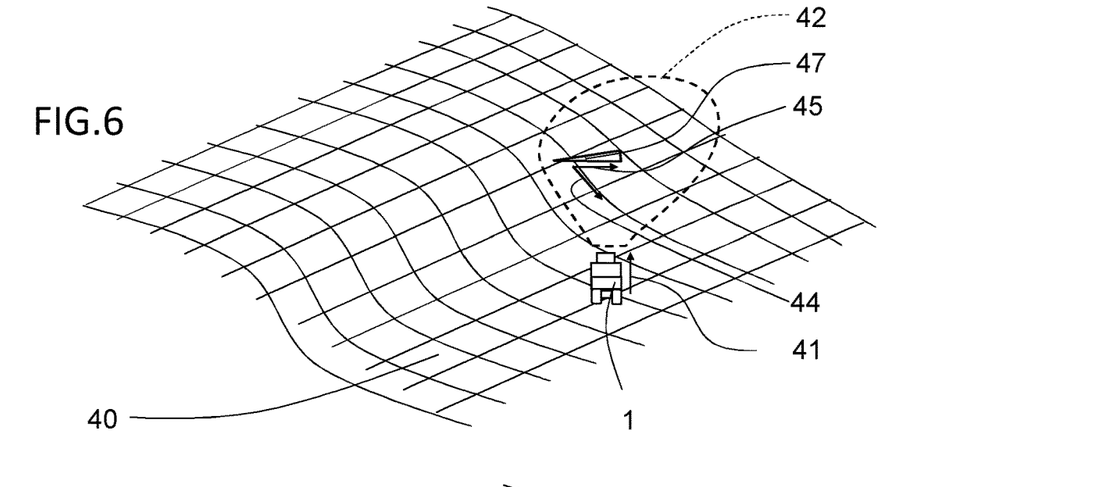
FIG. 6 shows a working machine approaching a relatively large gradient at an angle to the slope direction.

The example embodiment of the method taking the slope direction 44 into account comprises:

a first step 90 of obtaining ground topographic data of a geographical area 42 located close to the working machine by means of a ground topographic detection system 19 positioned on the working machine 1;

a second step 91 of extracting a ground gradient 22 from the ground topographic data, as shown in FIG. 5. Only a single ground gradient 22 is shown for sake of simplicity;

a third step 92 of determining a slope direction 44 of the ground at the extracted ground gradient 22. This may be performed by analysing the ground topographic data obtained by the ground topographic detection system 19;

a fourth step 93 of determining a relative angle between the slope direction 44 and the current driving direction 41 of the working machine. This may be also performed by analysing the ground topographic data obtained by the ground topographic detection system 19;

a fifth step 94 of obtaining weight information of the load being currently transported. As discussed previously, the weight information may for example be obtained by means of an on-board load weighting system or by receiving load information originating from the device that loaded the load being currently transported;

a sixth step 95 of determining a current maximal allowed ground gradient for the working machine at the location of the extracted ground gradient 22 based both on the obtained weight information and the determined relative angle. The method for also taking the relative angle into account may for example be performed by first determining at the location of the extracted ground gradient 22 a current maximal allowed ground gradient in a direction 45 perpendicular to the driving direction 41, based in the obtained weight information, and secondly, transforming this maximal allowed ground gradient into a current maximal allowed ground gradient in the slope direction 44. Clearly, for working machines that are mainly sensitive against sideways rollover, the maximal allowed ground gradient in the slope direction is larger than the maximal allowed ground direction in the direction 45 perpendicular to the driving direction 41. This approach may consequently be suitable for working machines that are mainly sensitive against sideways rollover. Working machines that are sensitive to forward and/or rearward rollover may instead, or in addition, determining, at the location of the extracted ground gradient 22, a maximal allowed ground gradient in a direction that is parallel with the driving direction 41;

a seventh step 96 of predicting a risk for working machine rollover if the working machine approaches a geographical area 42 including a ground gradient 22 exceeding or being close to the current maximal allowed ground gradient for the working machine.

The advantageous effect of taking also the relative angle between the sloping direction and the driving direction into account when determining the maximal allowed ground gradient is explained with reference to FIGS. 4, 5 and 10. Without taking into account the relative angle the method would have predicted a risk for working machine rollover due to the relatively large extracted ground gradient 22. However, when taking the relative angle into account, it becomes clear that the relatively large ground gradient 22 will not cause any significant risk for rollover due to the relatively small sideways inclination 47 of the working machine that will occur if traversing the location of the ground gradient 22 while driving along the driving direction 41.

As discussed above, having knowledge about the future driving path would improve the accuracy of the rollover risk prediction, because without knowledge of the future driving path the method and system must assume that the working machine can traverse the largest ground gradient that is detected close to the working machine. An example embodiment of the method including a prediction of a future driving path will hereinafter be described with reference to FIGS. 7 and 11.

Figure 7:
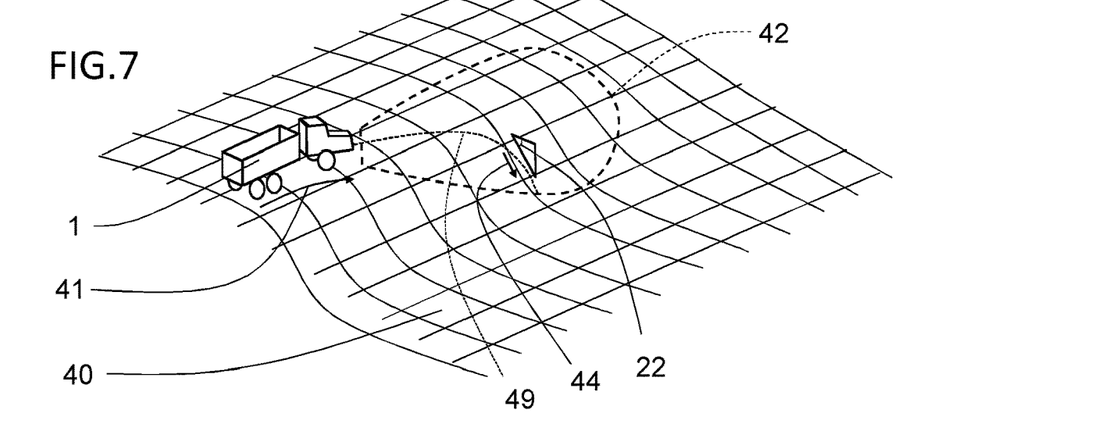
FIG. 7 shows a future driving path prediction based on current driving direction.
Figure 11:
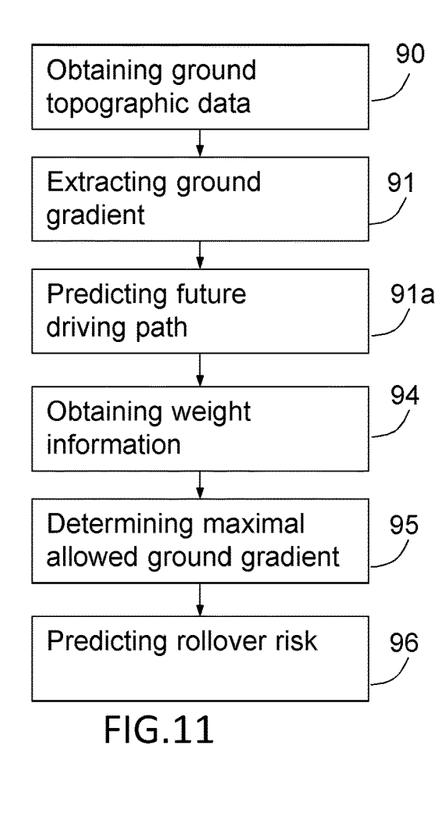
FIG. 11 shows a flow chart of the method according to a further example embodiment.

The example embodiment of the method including future driving path prediction comprises:

a first step 90 of obtaining ground topographic data of a geographical area 42 located close to the working machine by means of a ground topographic detection system 19 positioned on the working machine 1. The geographical area 42 may be adapted to follow the current driving direction 41 of the working machine;

a second step 91 of extracting a ground gradient 22 from the ground topographic data. Only a single ground gradient 22 is shown for sake of simplicity;

a third step 91a of predicting a future driving path 49 of the working machine. One example solution involves extrapolating a current driving direction. Such a solution is schematically illustrated in FIG. 7, where the working machine is steering towards the right and a predicted future driving path 49 is derived therefrom;

a fourth step 94 of obtaining weight information of the load being currently transported;

a fifth step 95 of determining a current maximal allowed ground gradient for the working machine, at the location of the extracted ground gradient 22 based on the obtained weight information; and a sixth step 96 of predicting a risk for working machine rollover if the predicted future driving path 49 includes a ground gradient 22 exceeding or being close to the current maximal allowed ground gradient for the working machine 1.

Figure 8:
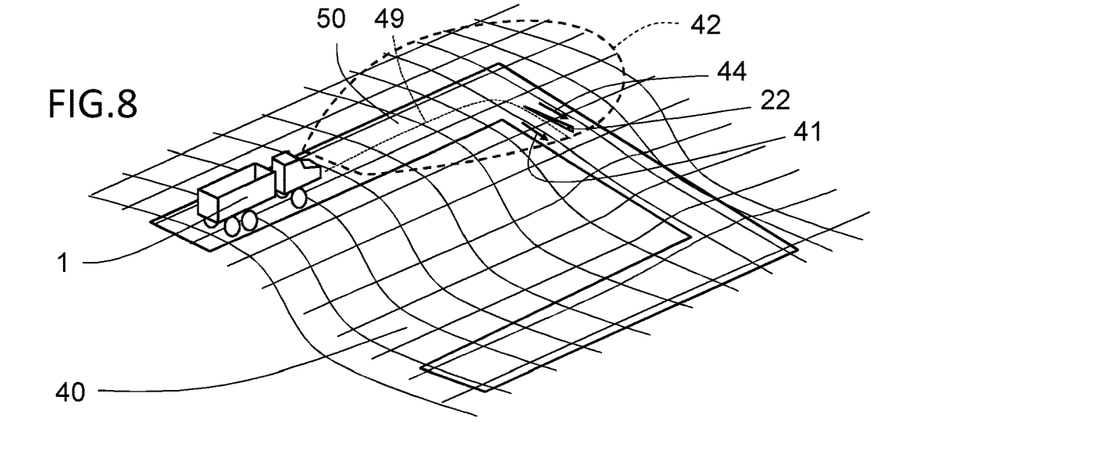
FIG. 8 shows a future driving path prediction based on road section detection.

According to an example embodiment for predicting future driving path, if a road is detected in the ground topographic data, it can be assumed with a certain likelihood that the working machine will follow that road. Thereby detected ground gradients located outside the road may possibly be ignored or less weighted when predicting risk for rollover, and mainly the ground gradients within the road area are deemed relevant when predicting rollover risk. According to this example embodiment, which is schematically illustrated in FIG. 8, the method involves:

obtaining ground topographic data of a geographical area 42 located close to the working machine by means of a ground topographic detection system 19 positioned on the working machine 1;

extracting a ground gradient 22 from the ground topographic data. Only a single ground gradient 22 is shown for sake of simplicity;

predicting a future driving path 49 of the working machine by detecting a road section 50 within the geographical area 42 and predicting that the working machine will follow the road section 50;

obtaining weight information of the load being currently transported;

determining a current maximal allowed ground gradient for the working machine, at the location of the extracted ground gradient 22 based on the obtained weight information; and predicting a risk for working machine rollover if the predicted future driving path 49 includes a ground gradient 22 exceeding or being close to the current maximal allowed ground gradient for the working machine 1.

According to an alternative example embodiment, which is also schematically illustrated in FIG. 8, the method my include also taking into account the relative angle between a sloping direction and vehicle driving direction for improved accuracy of the rollover risk prediction. According this embodiment, the method may comprise:

obtaining ground topographic data of a geographical area 42 located close to the working machine by means of a ground topographic detection system 19 positioned on the working machine 1;

extracting a ground gradient 22 from the ground topographic data;

determining a slope direction 44 at the location of the extracted ground gradient 22 predicting a future driving path 49 of the working machine by detecting a road section 50 within the geographical area 42;

predicting a driving direction 41 of the working machine 1 at a location of the extracted ground gradient 22 based on the predicted future driving path 49;

determining a relative angle between the slope direction 44 and the driving direction 44 of the working machine 1 along the predicted future driving path 49;

obtaining weight information of the load being currently transported;

determining a current maximal allowed ground gradient for the working machine 1 based on said weight information and the determined relative angle; and predicting a risk for working machine rollover if the predicted future driving path 49 includes a ground gradient 22 exceeding or being close to the current maximal allowed ground gradient for the working machine 1.

Still a further alternative approach for predicting the future driving path of the working machine may be based use of data of historical driving paths of the working machine in the present geographical area, and/or on data of historical driving paths of other similar working machines in the present geographical area. Regular sampling of geographical positions obtained for example by means of a satellite based global positioning system GPS during driving may be used for building historical driving paths at a working site. Subsequently, in the step of predicting a risk for working machine rollover, the future driving path 49 may be predicted based on the stored historical driving paths if such as available within the geographical area 42. The idea behind this approach is the assumption that the present working machine likely will follow the historical driving paths.

If a risk for rollover is predicted the method and system may be implemented in various ways for ensuring that necessary measures are taken for avoiding the a rollover actually occurs. For example, the method and system may be arranged to warn the driver that a risk for working machine rollover exists if the working machine continues approaching a geographical area 42. Thereby, the driver may well in advance select an alternative driving route that preferably includes lower ground gradients. The warnings may for example be visual and/or audible and/or vibrating. Information about a predicted rollover risk level may for example be illustrated and presented to a driver on a display, such as computer display or a head-up display. The prediction and presentation of rollover risk over a geographical area may be even further improved by generating a 3D ground topographic map based on the ground topographic data. At least two different risk prediction levels, such as "risk" and "no specific risk" may for example be displayed to a driver as differently coloured areas on a geographical map covering the working site. Possibly, more than two rollover risk prediction levels may implemented for increased degree of accuracy and sensitivity of the predicted rollover risk.

Alternatively, if the working machine comprises an autopilot for partly autonomous driving of the working machine, the method and system may comprise the step of alerting the autopilot of the working machine if a risk for working machine rollover has been predicted. After having received an alert, the autopilot may autonomously perform many different actions, such as stopping or slowing down the working machine by decreasing the speed or activating brakes, autonomously selecting an alternative route, alerting a driver about the predicted risk, or the like.

The ground topographic detection system may be selected from the group consisting of stereo vision camera system, a lidar system, a radar system, or combinations thereof. Detection of a point cloud representing a ground plane using any of these technologies, and extraction of ground gradients therefrom, as such are well-known and no specific additional disclosure is required for this purpose.

Figure 12:
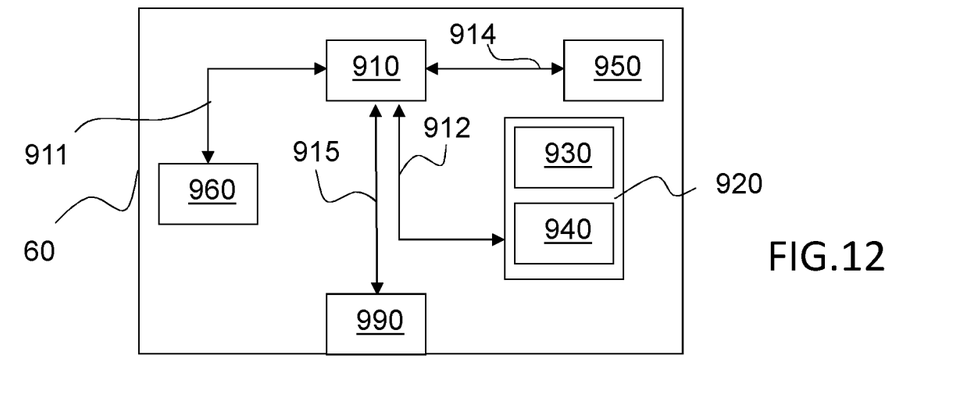
FIG. 12 shows a schematic illustration of a control unit.

The method for predicting a risk for rollover of a working machine for load transportation is typically performed by means of an electronic control unit 60. The present invention therefore also relates to a computer program, a computer readable medium carrying a computer program and an electronic control unit 60 for predicting a risk for rollover of a working machine for load transportation. FIG. 12 shows an example layout of an electronic control unit 60 comprising a non-volatile memory 920, a data processing unit 910 and a read and write memory 960. The data processing unit 910 may for example be a microprocessor.

The memory 920 may have a first memory part 930 and a second memory part 940. The first memory part 930 may have the computer program for predicting a risk for rollover of the working machine stored therein. The computer program in the memory part 930 for predicting a risk for rollover of the working machine 1 can be an operating system. The second memory part 940 may have a program for performing the method stored therein. In an alternative embodiment, the program for performing the method may be stored in a separate non-volatile storage medium 950 for data, such as, for example, a CD or an exchangeable semiconductor memory. The program can be stored in an executable form or in a compressed state. When it is stated below that the data-processing unit 910 runs a specific function, it should be clear that the data-processing unit 910 is running a specific part of the program stored in the second memory part 940 or a specific part of the program stored in the non-volatile storage medium 950.

The data-processing unit 910 is tailored for communication with the storage medium 950 through a data bus 914. The data-processing unit 910 is also tailored for communication with the memory 920 through a data bus 912. In addition, the data-processing unit 910 is tailored for communication with the read and write memory 960 through a data bus 911. The data-processing unit 910 is also tailored for communication with a data port 990 by the use of a data bus 915. The method according to the present invention can be executed by the data-processing unit 910, by the data-processing unit running the program stored in the memory 940 or the program stored in the non-volatile storage medium 950.

The example schematic layout of an electronic control unit 60 merely represents one single example embodiment of an electronic control unit 60 and a person skilled in the art would understand that many variations in the layout are possible within the scope of the invention.

The present invention may be embodied in other specific forms without departing from its spirit or essential characteristics. It is appreciated that various features of the above-described examples can be mixed and matched to form a variety of other alternatives. As such, the described embodiments are to be considered in all respects only as illustrative and not restrictive. The scope of the invention is, therefore, indicated by the appended claims rather than by the foregoing description. All changes that come within the meaning and range of equivalency of the claims are to be included within their scope.

Reference signs mentioned in the claims should not be seen as limiting the extent of the matter protected by the claims, and their sole function is to make claims easier to understand.

The order of method steps can be modified; in particular can the step of obtaining weight information be performed before the step of obtaining ground topographic data and/or extracting ground gradient. Also the step of determining maximal allowed ground gradient can be performed before the step of obtaining ground topographic data and/or extracting ground gradient.

The invention claimed is:

1. A method for predicting a risk for rollover of a working machine for load transportation, wherein the working machine comprises a load carrying attachment that is liftable in a vertical direction by a hydraulically controlled pivotal linkage mechanism, the method comprising:
obtaining ground topographic data of a geographical area located close to the working machine from a ground topographic detection system;
extracting at least one ground gradient from the ground topographic data;
predicting a future driving path of the working machine based on: a current working machine driving direction; and data of historical driving paths of at least one other working machine in a present geographical area;
obtaining weight information of the load being currently transported by an on-board load weighting system or by receiving load information originating from a device that loaded the load being currently transported;
obtaining a lift position of the load carrying attachment;
determining a centre of mass of the working machine;
determining a current maximal allowed ground gradient for the working machine based on the weight information, the centre of mass, and the lift position;
predicting a risk for working machine rollover if the predicted future driving path of the working machine includes a ground gradient exceeding or being close to the current maximal allowed ground gradient for the working machine; and
performing an action to reduce the risk for rollover.

2. The method of claim 1, wherein the working machine is an articulated hauler or mining truck.

3. The method of claim 1, wherein the working machine is front end wheel loader.

4. The method according to claim 1, comprising predicting the risk for working machine rollover if a current driving direction of the working machine coincides with a geographical position having a ground gradient exceeding or being close to the current maximal allowed ground gradient for the working machine.

5. The method according to claim 1, comprising:
determining a slope direction of the ground at the extracted at least one ground gradient;
determining a relative angle between the slope direction and the current working machine driving direction;
determining the current maximal allowed ground gradient for the working machine based on the weight information and the determined relative angle; and
predicting the risk for working machine rollover if the working machine approaches a geographical area including a ground gradient exceeding or being close to the current maximal allowed ground gradient for the working machine.

6. The method according to claim 1, comprising predicting the future driving path of the working machine based on at least the current working machine driving direction.

7. The method according to claim 1, comprising
detecting a road section in the ground topographic data; and
predicting the future driving path of the working machine based at least on the detected road section.

8. The method according to claim 1, comprising
predicting at least one of a working machine speed or a working machine acceleration along the predicted future driving path of the working machine; and
determining the current maximal allowed ground gradient for the working machine based on both the weight information and the predicted working machine speed and/or working machine acceleration along the predicted future driving path.

9. The method according to claim 1, comprising:
determining a slope direction of the ground at the extracted at least one ground gradient;
predicting a driving direction of the working machine at a location of the extracted at least one ground gradient based on the predicted future driving path;
determining a relative angle between the slope direction and the driving direction of the working machine along the predicted future driving path; and
determining the current maximal allowed ground gradient for the working machine based on the weight information and the determined relative angle.

10. The method according to claim 1, wherein the step of predicting a future driving path of the working machine is restricted to predicting a near future driving path of the working machine; and the step of performing an action to reduce the risk for rollover comprises warning a driver and is restricted to warning the driver for a near future risk for working machine rollover if the predicted near future driving path includes a ground gradient exceeding or being close to the current maximal allowed ground gradient for the working machine.

11. The method according to claim 10, wherein the step of predicting a near future driving path is restricted to predicting a future driving path within a range of 5-300 metres from the working machine.

12. The method according to claim 1, wherein the working machine is configured to be driven by a physical driver located in a driver's cabin of the working machine, or wherein the working machine is configured to be remote controlled by a physical driver.

13. The method according to claim 1, comprising warning a driver if the risk for working machine rollover is predicted.

14. The method according to claim 1, comprising alerting an autopilot of the working machine if the risk for working machine rollover is predicted.

15. The method according to claim 1, wherein the ground topographic detection system is positioned on the working machine.

16. The method according to claim 15, wherein the ground topographic detection system is selected from the group consisting of stereo vision camera system, a lidar system, a radar system, or combinations thereof.

17. The method according to claim 15, wherein the ground topographic detection system positioned on the working machine is the only means used for obtaining ground topographic data of the geographical area located close to the working machine.

18. The method according to claim 1, wherein the ground topographic detection system is positioned on an unmanned aerial vehicle.

19. The method according to claim 1, comprising generating a 3D ground topographic map based on the ground topographic data.

20. A computer comprising a computer program for performing the steps of claim 1 when the program is run on the computer.

21. A non-transitory computer readable medium carrying a computer program for performing the method of claim 1 when the computer program is run on a computer.

22. A control unit for controlling a prediction system for predicting a risk for rollover of a working machine for load transportation, wherein the working machine comprises a load carrying attachment that is liftable in a vertical direction by means of hydraulically controlled pivotal linkage mechanism, the control unit being configured for:
  obtaining ground topographic data of a geographical area located close to the working machine from a ground topographic detection system;
  extracting at least one ground gradient from the ground topographic data;
  predicting a future driving path of the working machine based on: a current working machine driving direction; and data of historical driving paths of at least one other working machine in a present geographical area;
  obtaining weight information of the load being currently transported by an on-board load weighting system or by receiving load information originating from a device that loaded the load being currently transported;
  obtaining a lift position of the load carrying attachment;
  determining a centre of mass of the working machine;
  determining a current maximal allowed ground gradient for the working machine based on the weight information, the centre of mass, and the lift position;
  predicting a risk for working machine rollover if the predicted future driving path of the working machine includes a ground gradient exceeding or being close to current maximal allowed ground gradient for the working machine; and
  performing an action to reduce the risk for rollover.

23. A prediction system for predicting a risk for rollover of a working machine for load transportation, wherein the working machine comprises a load carrying attachment that is liftable in a vertical direction by means of hydraulically controlled pivotal linkage mechanism, the system comprising:
  an on-board load weighting system configured for detecting weight information of the load being currently transported, or a communication unit configured for receiving load information originating from a device that loaded the load being currently transported;
  a ground topographic detection system; and
  an electronic control unit, which is configured for:
    obtaining ground topographic data of a geographical area located close to the working machine from the ground topographic detection system;
    extracting at least one ground gradient from the ground topographic data;
    predicting a future driving path of the working machine based on: a current working machine driving direction; and data of historical driving paths of at least one other working machine in a present geographical area;
    obtaining a lift position of the load carrying attachment;
    determining a centre of mass of the working machine;
    obtaining weight information of the load being currently transported from the on-board load weighting system or from the communication unit;
    determining a current maximal allowed ground gradient for the working machine based on the weight information, the centre of mass, and the lift position;
    predicting a risk for working machine rollover if the predicted future driving path of the working machine approaches a geographical area including a ground gradient exceeding or being close to the current maximal allowed ground gradient for the working machine; and
    performing an action to reduce the risk for rollover.

24. A working machine comprising a prediction system according to claim 23.

* * * * *